US009397458B2

(12) United States Patent
Wang et al.

(10) Patent No.: US 9,397,458 B2
(45) Date of Patent: Jul. 19, 2016

(54) CONNECTOR ASSEMBLY THAT HAS OPTICAL AND HIGH DATA RATE ELECTRICAL CAPABILITIES AND THAT IS BACKWARDS COMPATIBLE WITH EARLIER UNIVERSAL SERIAL BUS (USB) STANDARDS

(75) Inventors: Tak K. Wang, Cupertino, CA (US); Chung-Yi Su, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1224 days.

(21) Appl. No.: 13/004,016

(22) Filed: Jan. 10, 2011

(65) Prior Publication Data

US 2012/0177375 A1 Jul. 12, 2012

(51) Int. Cl.
*G02B 6/36* (2006.01)
*H01R 27/00* (2006.01)
*G02B 6/38* (2006.01)

(52) U.S. Cl.
CPC .............. *H01R 27/00* (2013.01); *G02B 6/3817* (2013.01); *Y10T 29/49204* (2015.01)

(58) Field of Classification Search
CPC ............................. H01R 27/00; G02B 6/3817
See application file for complete search history.

(56) References Cited

U.S. PATENT DOCUMENTS

| 7,021,971 | B2 | 4/2006 | Chou et al. |
| 2008/0084834 | A1 | 4/2008 | Stanek |
| 2009/0088024 | A1 | 4/2009 | Ling et al. |
| 2009/0231485 | A1 | 9/2009 | Steinke |
| 2009/0248924 | A1 | 10/2009 | Melin |

*Primary Examiner* — Omar R Rojas (57) ABSTRACT

A connector assembly is provided that has optical communications capabilities and high data rate electrical communications capabilities and that is backwards compatible with one or more USB standards. A socket of the connector assembly has high data rate electrical connections and USB electrical connections such that it is capable of supporting high data rate signaling protocols for high data rate devices as well as USB signaling protocols. A plug of the connector assembly has high data rate electrical connections, USB electrical connections, and an optical-to-electrical (OE)/electrical-to-optical (EO) conversion module. The socket can be mated with the plug of the invention and with USB plugs that are compliant with existing USB plugs. Thus, both the socket and the plug have backwards compatibility with one or more existing USB standards.

21 Claims, 11 Drawing Sheets

CONNECTOR ASSEMBLY THAT HAS OPTICAL AND HIGH DATA RATE ELECTRICAL CAPABILITIES AND THAT IS BACKWARDS COMPATIBLE WITH EARLIER UNIVERSAL SERIAL BUS (USB) STANDARDS

TECHNICAL FIELD OF THE INVENTION

The invention relates to a connector assembly that has optical and high data rate electrical capabilities and that is backwards compatible with earlier Universal Serial Bus (USB) standards.

BACKGROUND OF THE INVENTION

USB is an external bus standard that specifies the electrical connections and data transfer operations needed to enable electronic devices to interface and communicate with each other. USB is a serial interface that is often used in place of RS232 serial interfaces and parallel interfaces to connect peripheral devices (e.g., mice, keyboards, printers, etc.) to computers (e.g., desktop and laptop computers). Most desktop and laptop computers on the market today are equipped with multiple USB connectors, each of which is designed to mate with a respective USB plug. A typical USB connector is configured with electrical contacts that are designed to couple to electrical contacts external to the USB connector in order to perform data transfer and power supply functions. Some of the electrical contacts of the USB connector are used to couple electrical contacts of a USB plug to the electrical circuitry of the USB connector, whereas some of the electrical contacts of the USB connector are used to couple the electrical circuitry of the USB connector to conductive traces formed on a motherboard of a computer. The combination of the USB connector mated with the USB plug is known as a USB connector assembly.

In recent years, owing to the increasing amount of data traffic between computers and their peripheral devices, USB connector assemblies have been equipped to support increasing speeds: e.g., increases from the 10 megabits per second (Mbps) speed provided by the USB1 standard to the 480 Mbps and 5 gigabits per second (Gbps) speeds provided by the USB2 and USB3 standards, respectively. There continues to be a demand for computer-to-peripheral communications that operate at even higher speeds. For example, most high-resolution, real-time video will require data rates above 10 Gbps. At speeds above 5 Gbps, the conventional copper wire connections used for USB devices will become difficult to implement and will have limited reach.

An important goal in the latest generations of thin, lightweight, low-power consumption computing devices is reducing the number of input/output (I/O) ports on the computing devices. The use of USB connector assemblies to replace other types of legacy connector assemblies has helped achieve the goal of reducing the number of ports that are needed on computing devices. However, the limited number of signal pins (two for USB2 standard for simplex communications and four for USB3 for duplex communications) is insufficient to accommodate multi-pin, high-speed interfaces, such as, for example, High Definition Multi-Media Interface (HDMI) and DisplayPort interfaces needed for high-resolution display devices.

Accordingly, a need exists for a connector assembly that is capable of accommodating multi-pin, high-speed interfaces needed for high data rate devices, such as high-resolution display devices, for example, and that is backwards compatible with USB standards.

SUMMARY OF THE INVENTION

The invention is directed to a socket, a connector assembly comprising a socket and a plug mated with the socket, and a method for communicating signals in the connector assembly. The socket comprises a socket housing and an electrical support structure secured to the socket housing. The socket housing has a plug opening therein for receiving a plug. The electrical support structure has high data rate electrical connections disposed thereon for communicating high data rate signals and Universal Serial Bus (USB) electrical connections disposed thereon for communicating USB signals.

The connector assembly comprises the socket and a plug. The plug comprises a plug housing that is mated with the plug opening of the socket. The plug housing includes at least one of USB electrical connections and high data rate electrical connections. If the plug housing has USB electrical connections, the USB electrical connections of the plug housing are interfaced with the USB electrical connections of the socket housing. If the plug housing has high data rate electrical connections, the high data rate electrical connections of the plug housing are interfaced with the high data rate electrical connections of the socket housing.

In accordance with an embodiment, the plug of the connector assembly further comprises an optics system disposed within the plug housing and an optical-to-electrical/electrical-to-optical (OE/EO) conversion module disposed within the plug housing. The OE/EO conversion module converts high data rate signals communicated from the socket housing to the plug housing into first optical signals that are coupled by the optics system into an end of a first optical fiber. The OE/EO conversion module converts optical signals coupled onto the OE/EO conversion module by the optics system into high data rate signals.

The method comprises mating a plug of the connector assembly with a socket of the connector assembly. In accordance with an embodiment, the plug and the socket each have high data rate electrical connections for communicating high data rate signals and USB electrical connections for communicating USB signals. The high data rate electrical connections of the plug are electrically coupled to the high data rate electrical connections of the socket. The USB electrical connections of the plug are electrically coupled to the USB electrical connections of the socket. The plug includes an optics system and an OE/EO conversion module disposed within a housing of the plug. In the OE/EO conversion module of the plug, high data rate signals communicated from the socket housing to the plug housing are converted into first optical signals. With the optics system, the first optical signals are coupled into an end of a first optical fiber and second optical signals passing out of an end of a second optical fiber are coupled onto the OE/EO conversion module. In the OE/EO conversion module, the second optical signals are converted into high data rate signals that are communicated from the plug to the socket via the electrically coupled high data rate electrical connections of the plug and socket.

In accordance with another embodiment of the method, the socket has at least one of high data rate electrical connections for communicating high data rate signals and USB electrical connections for communicating USB signals. If the plug has USB electrical connections, the USB electrical connections of the plug are electrically coupled to the USB electrical connections of the socket. If the plug has high data rate electrical connections, the high data rate electrical connections of the plug are electrically coupled to the high data rate electrical connections of the socket.

These and other features and advantages of the invention will become apparent from the following description, drawings and claims.

DETAILED DESCRIPTION OF AN ILLUSTRATIVE EMBODIMENT

The invention is directed to a connector assembly that has optical communications capabilities and high data rate electrical communications capabilities and that is backwards compatible with one or more USB standards. A socket of the connector assembly has high data rate electrical connections and USB electrical connections such that it is capable of supporting high-speed signaling protocols for high data rate devices, such as high-resolution display devices, for example, as well as USB signaling protocols. The high data rate electrical connections may include, for example, but are not limited to, HDMI and DisplayPort interfaces. A plug of the connector assembly has high data rate electrical connections, USB electrical connections, and an optical-to-electrical (OE)/electrical-to-optical (EO) conversion module. The plug can be used to terminate a USB electrical cable having USB electrical wiring, an optical cable having a transmit optical fiber and a receive optical fiber, or a hybrid cable having a transmit optical fiber, a receive optical fiber and USB electrical wiring. The socket can be mated with the plug of the invention and with USB plugs that are compliant with existing USB standards. Thus, both the socket and the plug have backwards compatibility with one or more existing USB standards.

In accordance with an illustrative, or exemplary, embodiment of the connector assembly, the socket of the connector assembly is configured to mate with USB2 and USB3 plugs and with the plug of the invention. The terms "USB2 plug" and "USB3 plug" are intended to denote plugs that are compliant with USB2 and USB3 standards, respectively. If a USB2 or USB3 plug is mated with the socket of the connector assembly, the connector assembly will operate in accordance with the USB2 standard. If the socket of the connector assembly is mated with the plug of the connector assembly, the connector assembly can operate in an electrical USB2 mode and can operate in an optical mode, depending on whether the cable that is terminated with the plug is carrying optical signals over optical fibers or electrical signals over USB2 electrical wiring. If the cable includes a transmit optical fiber and a receive optical fiber on which optical signals are carried, the OE/EO conversion module of the plug will convert the optical signals carried on the receive optical fiber into high data rate electrical signals and will convert high data rate electrical signals into optical signals that are output onto the transmit optical fiber. If the cable is carrying USB2 electrical signals, the USB2 wiring of the plug will conduct the signals onto the USB2 wiring of the socket. Illustrative embodiments of the invention will now be described with reference to FIGS. 1A and 6B.

Figure 1A:
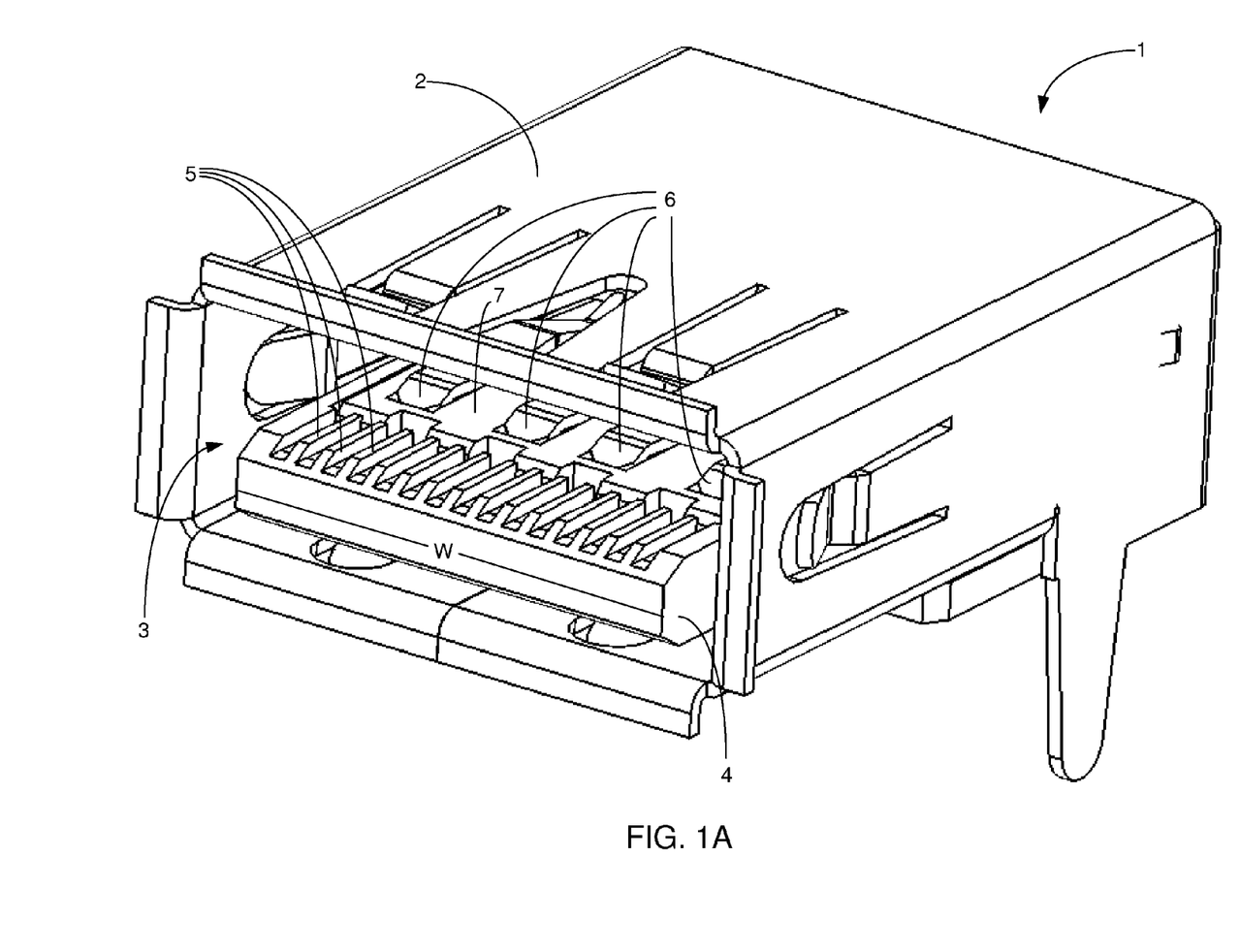
FIGS. 1A and 1B illustrate top and bottom perspective views of the socket of the connector assembly in accordance with an illustrative embodiment.
Figure 1B:
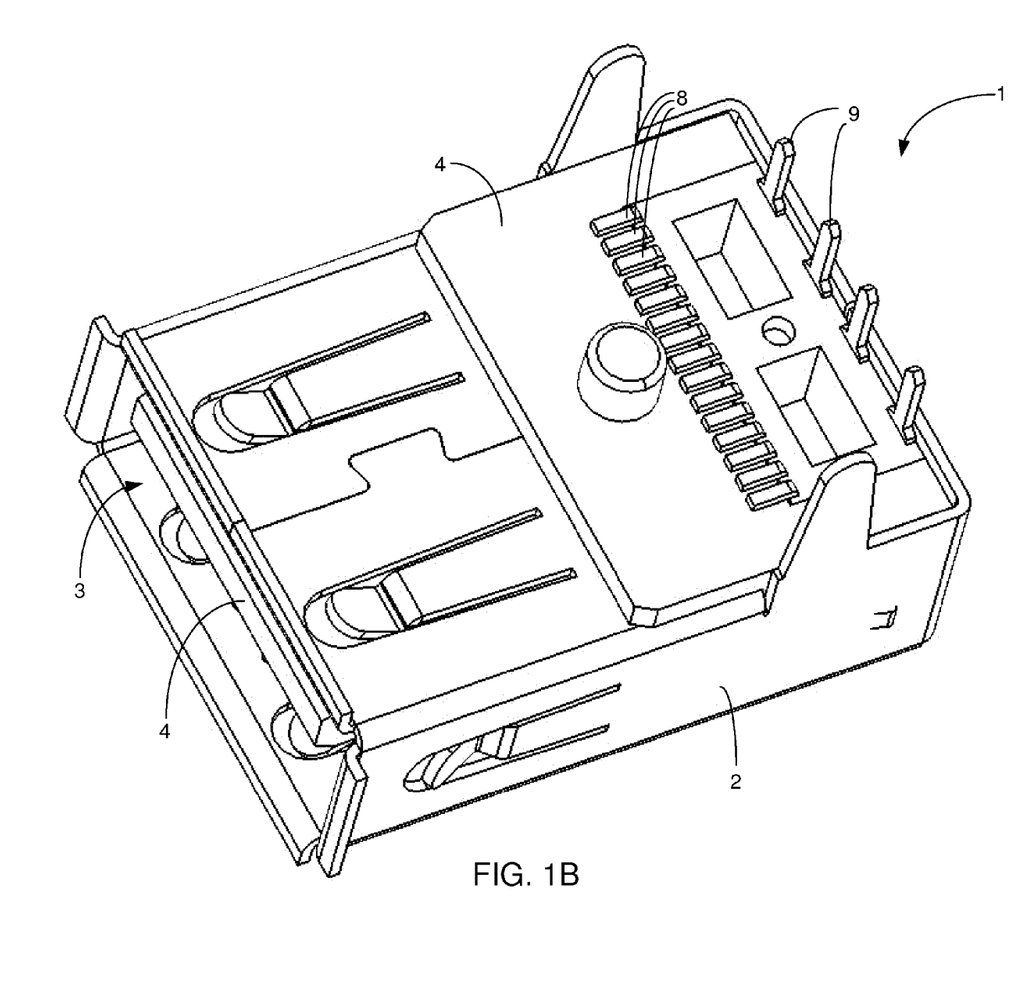

FIGS. 1A and 1B illustrate top and bottom perspective views of the socket 1 of the connector assembly in accordance with an illustrative embodiment. A socket housing 2 of the socket 1 is very similar in configuration to a typical USB2 socket housing, and therefore will be referred to herein as a modified USB socket housing. With reference to FIG. 1A, the socket housing 2 has an opening 3 therein for receiving a plug (not shown). A first electrical support structure 4 is secured to one or more interior surfaces of the socket housing 2. High data rate electrical connections 5 that support multiple differential I/O channels are disposed on the first electrical support structure 4. USB2 electrical connections 6 are disposed on a second electrical support structure 7. The first electrical support structure 4 has a width, W, that is slightly less than the width of an electrical support structure of a typical USB2 socket (not shown). The reason for this difference in widths is described below with reference to FIGS. 1A and 2.

A portion of the first electrical support structure 4 is disposed on the bottom surface of the socket housing 2. Surface-mount high-speed electrical connections 8 and through-hole USB2 electrical connections 9 are disposed on this portion of the electrical support structure 4. The surface-mount high data rate electrical connections 8 are disposed for connection to external surface-mount high data rate electrical connections, such as, for example, high data rate electrical connections (not shown) disposed on an upper surface of a printed circuit board (PCB) (not shown). Likewise, the through-hole USB2 electrical connections 8 are disposed for connection to external USB2 electrical connections, such as, for example, USB2 electrical wiring (not shown) of a PCB (not shown). The through-hole USB2 electrical connections 9 and the surface-mount high-speed electrical connections 8 are electrically coupled to the USB2 electrical connections 6 and the high data rate electrical connections 5, respectively.

As indicated above, the socket 1 is capable of being mated with existing USB2 and USB3 plugs, and thus has backwards compatibility to USB2 and USB3 standards. In accordance with this illustrative embodiment, the socket 1 will operate as a USB2 socket if either of an existing USB2 or USB3 plug is mated with the socket 1. The socket 1 will operate as either a USB2 socket or as a high data rate socket if the socket 1 is mated with the plug of the connector assembly, as will now be described with reference to FIGS. 1A and 2.

Figure 2:
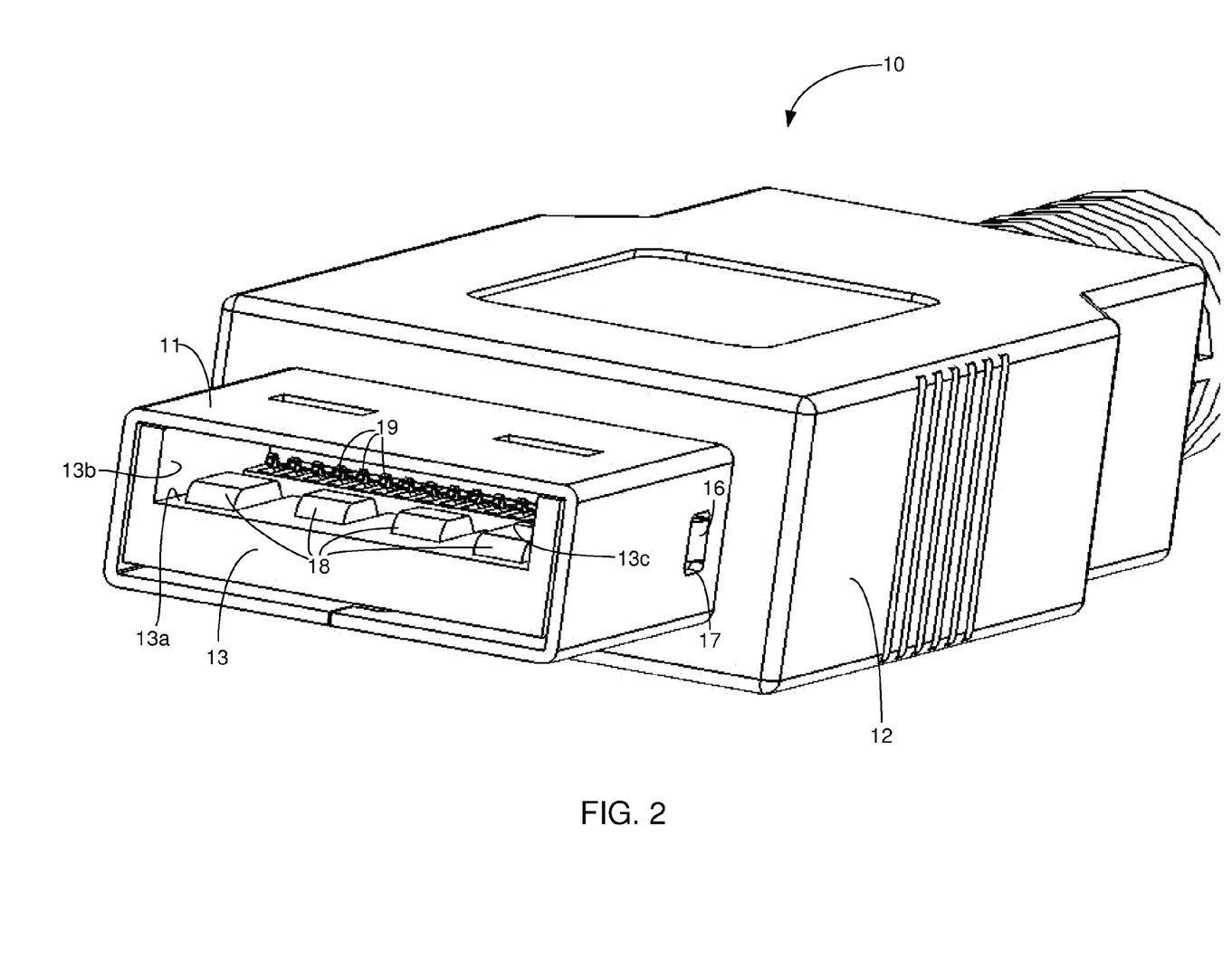
FIG. 2 illustrates a front perspective view of the plug of the connector assembly in accordance with an illustrative embodiment.

FIG. 2 illustrates a front perspective view of the plug 10 of the connector assembly in accordance with an illustrative embodiment. The plug 10 has a plug housing 11 that is very similar to a USB2 plug housing (not shown), and therefore will be referred to herein as a modified USB plug housing 11. A plastic molded plug exterior body 12 is secured to the modified USB plug housing 11. The tray 13 has a tray surface 13a and side walls 13b and 13c. The distance, D, between the side walls 13b and 13c of the tray 13 is almost equal to, but is slightly greater than, the width, W, of the first electrical support structure 4 (FIG. 1A). These dimensions allow the plug housing 11 to be received within the opening 3 of the socket housing 2, but the side walls 13b and 13c of the tray 13 provide mechanical resistance that prevents insertion of the plug housing 11 into a standard USB socket (e.g., a USB2 or USB3 socket). This feature of the plug housing 11 ensures that users will not accidentally mate the plug 10 with an incompatible USB socket.

The tray 13 is secured to the plug housing 11 by latching elements 16 disposed on opposite sides of the tray 13 that engage openings 17 disposed on opposite sides of the plug housing 11. The tray 13 has USB2 electrical connections 18 disposed thereon in a forward portion of the tray 13 and high data rate electrical connections 19 disposed thereon behind the USB electrical connections 18. When the plug 10 is mated with the socket 1, the USB2 electrical connections 6 and 18 are in contact with each other and the high data rate electrical connections 5 and 19 are in contact with each other. As will now be described with reference to FIGS. 3A and 3B, the tray 13 of the plug 10 also includes an OE/EO conversion module that is not visible in the view shown in FIG. 2.

Figure 3A:
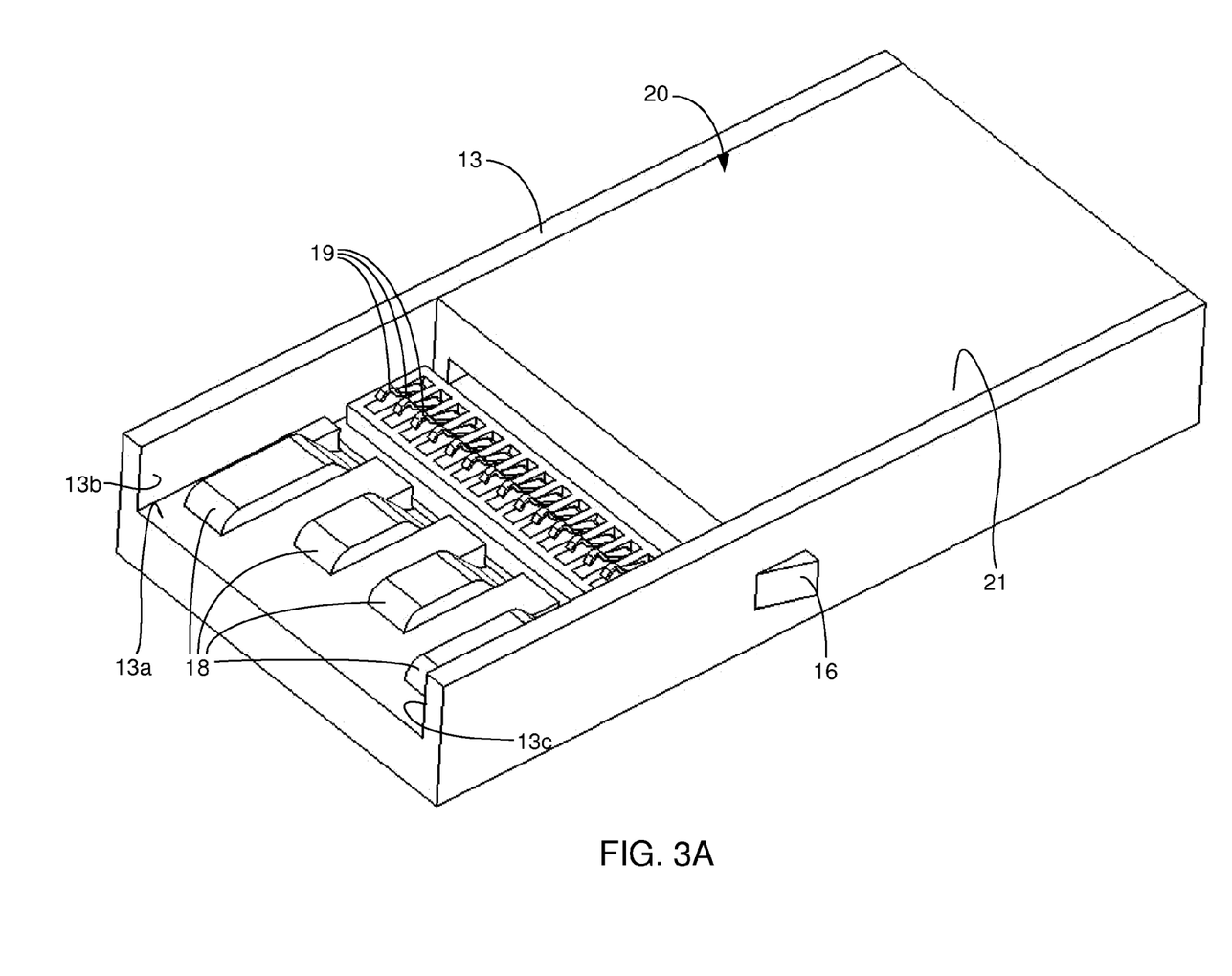
FIGS. 3A-3C illustrate top perspective views of the tray of the plug shown in FIG. 2 in its fully-assembled, partially-assembled and disassembled forms, respectively.
Figure 3B:
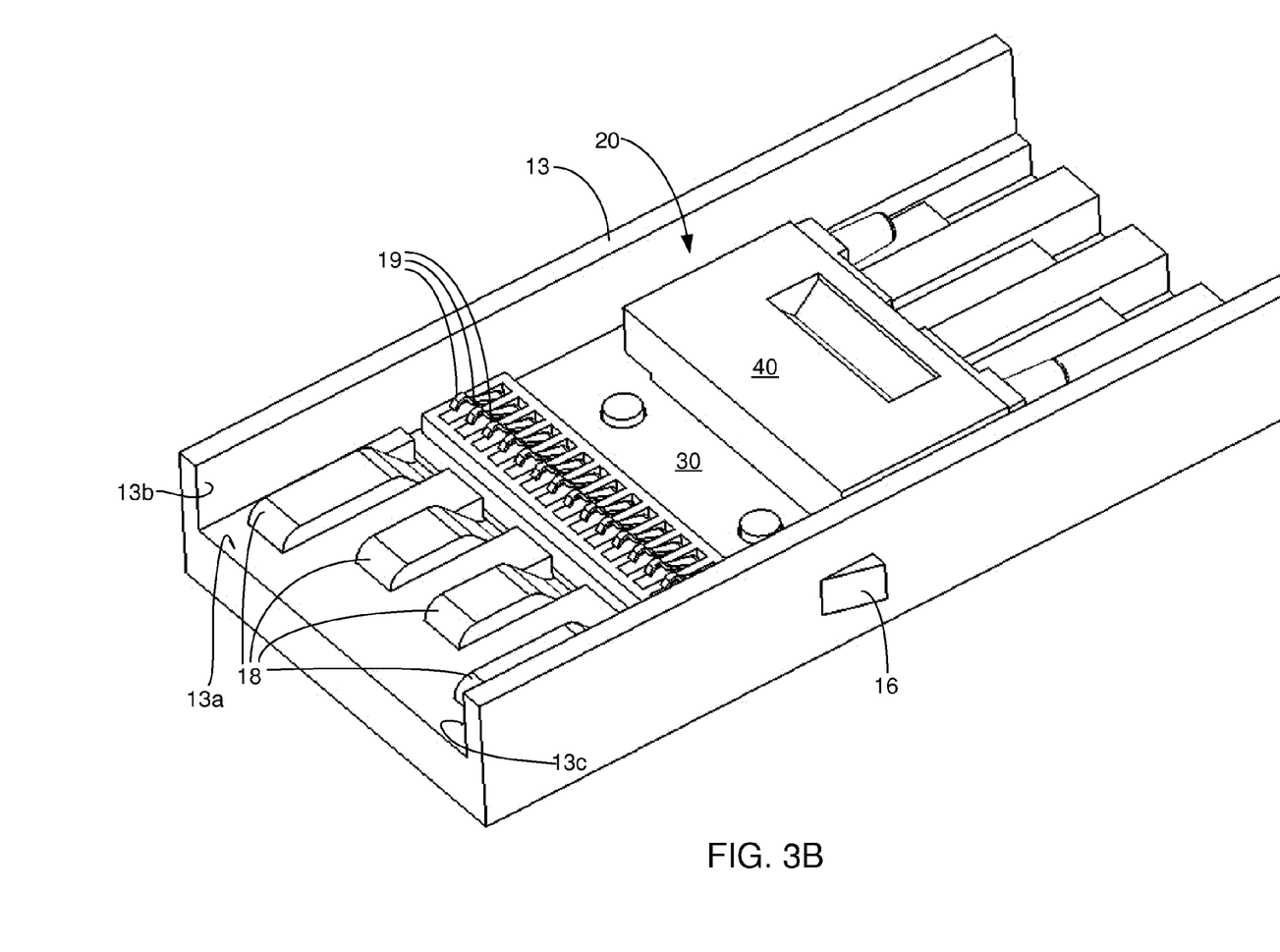
Figure 3C:
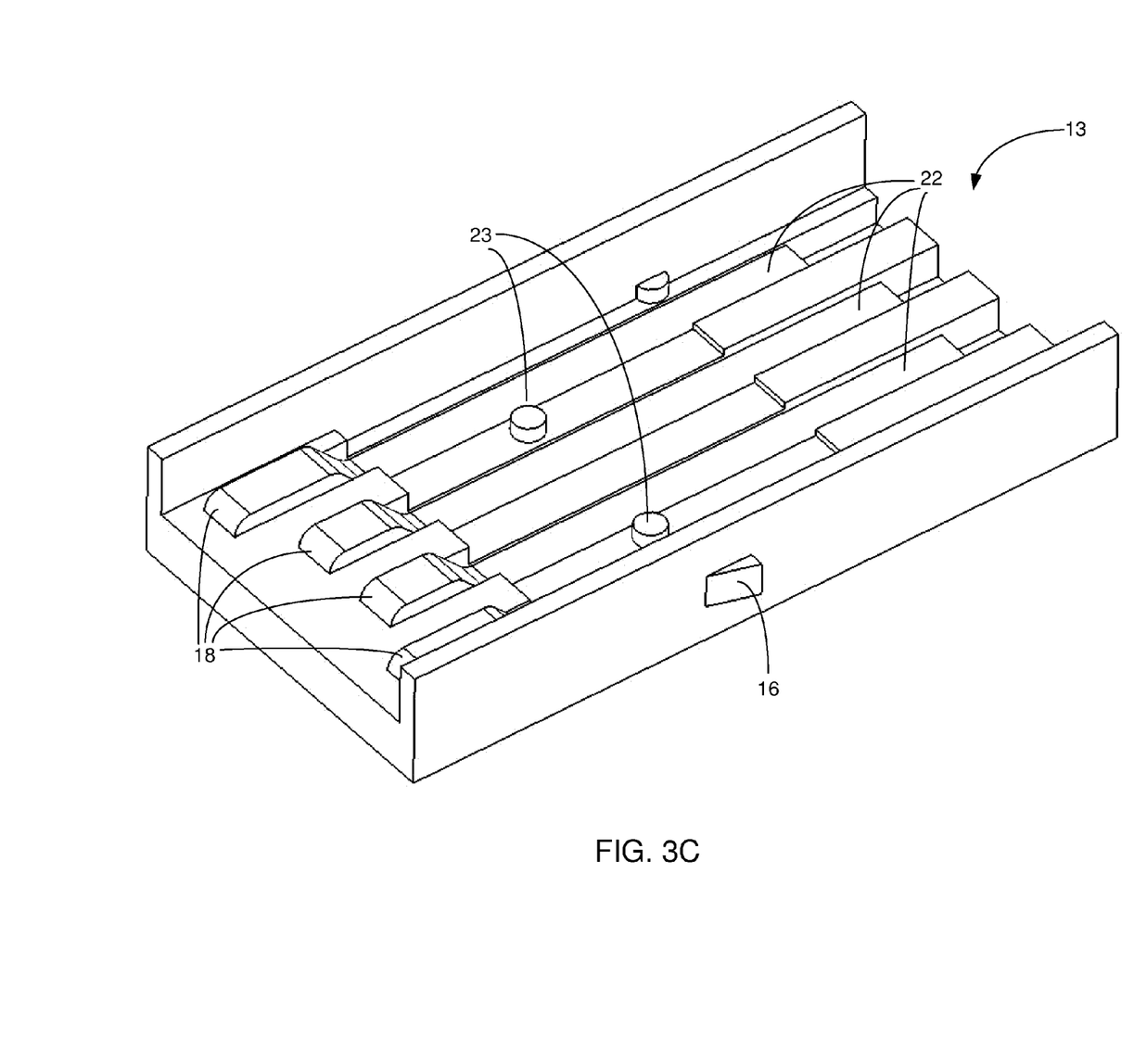
Figure 4A:
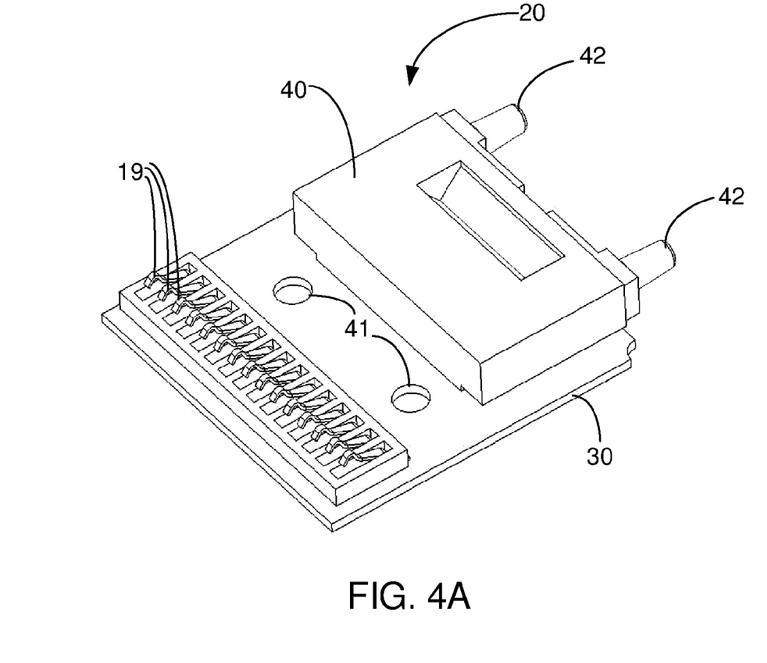
FIGS. 4A and 4B illustrate front and back perspective views, respectively, of the OE/EO conversion module before it is secured to the tray shown in FIG. 3C.
Figure 4B:
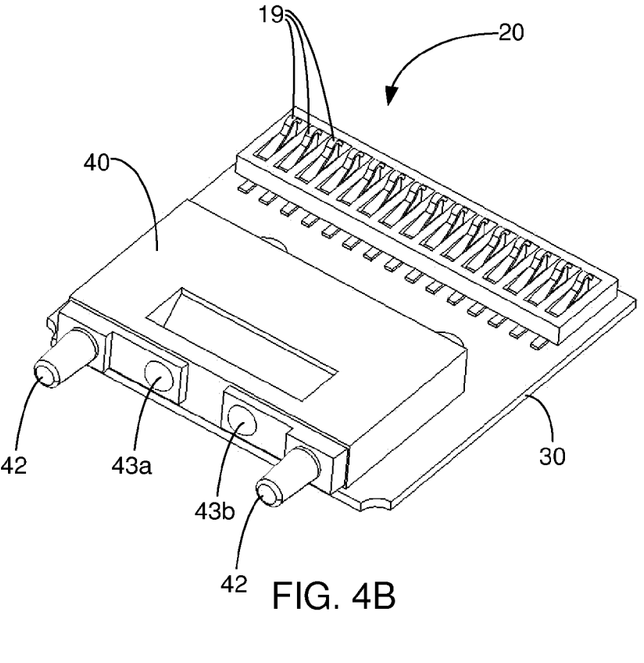

FIGS. 3A-3C illustrate top perspective views of the tray 13 of the socket 10 shown in FIG. 2 at various stages of assembly. In FIG. 3A, the tray 13 is shown in its fully-assembled form to include the USB2 electrical connections 18, the high data rate electrical connections 19, and an OE/EO conversion module 20. In FIG. 3B, the tray 13 is shown in a partially-assembled form with the cover 21 of the OE/EO conversion module 20 removed to reveal the components of the OE/EO conversion module 20. In FIG. 3C, the tray 13 is shown in a disassembled form with the OE/EO conversion module 20 removed to reveal the upper surface of the tray 13. FIGS. 4A and 4B illustrate front and back perspective views, respectively, of the OE/EO conversion module 20 shown in FIGS. 3A and 3B.

With reference to FIG. 3A, the USB2 electrical connections 18, the high data rate electrical connections 19 and the OE/EO conversion module 20 are shown. The high data rate electrical connections 19 are part of the OE/EO conversion module 20. In FIG. 3A, the components of the OE/EO conversion module 20 are blocked from view by the cover 21 of the OE/EO conversion module 20. In FIG. 3B, the cover 21 has been removed to reveal the components of the OE/EO conversion module 20. The OE/EO conversion module 20 includes a PCB 30 having electrically conductive traces (not shown) therein, the high data rate electrical connections 19 mounted on the PCB 30, and an optics system 40 mounted on the PCB 30. As can be seen in FIG. 3C, electrical conductors 22 that are connected to the USB2 electrical connections 18 extend along the surface of the tray 13. If the plug 10 (FIG. 2) is used to terminate a cable (not shown) having a USB2 wiring configuration, the ends of the electrical conductors 22 opposite the USB2 electrical connections 18 will be connected to respective electrical wires (not shown) of the cable. The surface of the tray 13 has passive alignment pins 23 thereon that engage complementarily-shaped openings (not shown) formed in the optics system 40 to align the optics system 40 with the PCB 30.

FIGS. 4A and 4B illustrate front and back perspective views of the OE/EO conversion module 20 of the plug 10 shown in FIG. 2. The optics system 40 has passive alignment devices 42 thereon. When the plug 10 shown in FIG. 2 is in its fully-assembled form, the passive alignment devices 42 are contained within respective complementarily-shaped openings (not shown) formed in the plug housing 11 (FIG. 2). The optics system 40 has optical ports 43a and 43b formed therein that are optically coupled with respective ends of respective transmit and receive optical fibers (not shown). The optical ports 43a and 43b are typically optically coupled with the respective ends of the optical fibers by lenses (not shown) that collimate the light, as will be described below with reference to FIGS. 5C and 5D. For ease of illustration and for clarity, the optical fibers and the collimating lenses are not shown in FIGS. 4A and 4B.

Figures 5A, 5B:
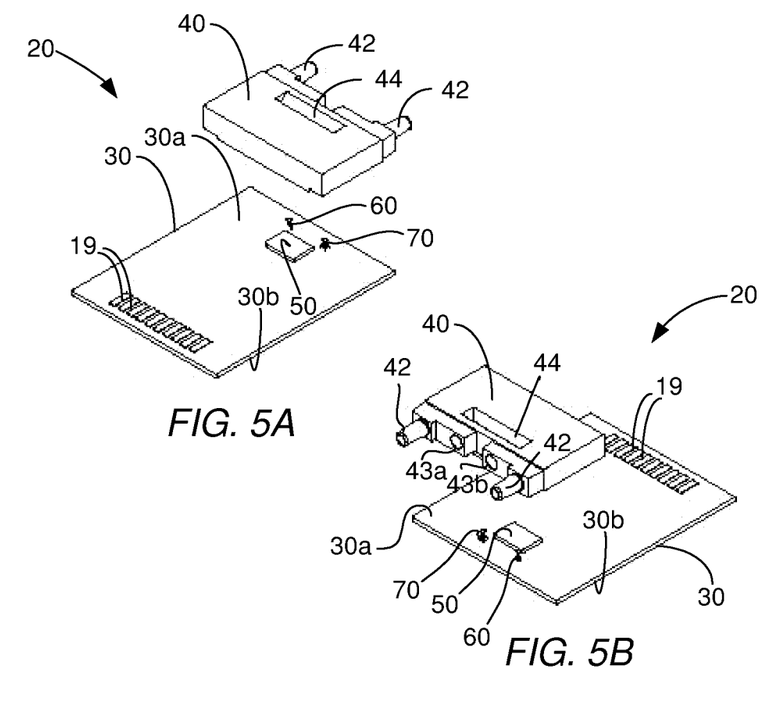
FIGS. 5A and 5B illustrate front and back perspective views, respectively, of the OE/EO conversion module shown in FIGS. 4A and 4B with the cover of the OE/EO conversion module removed.
Figure 5C:
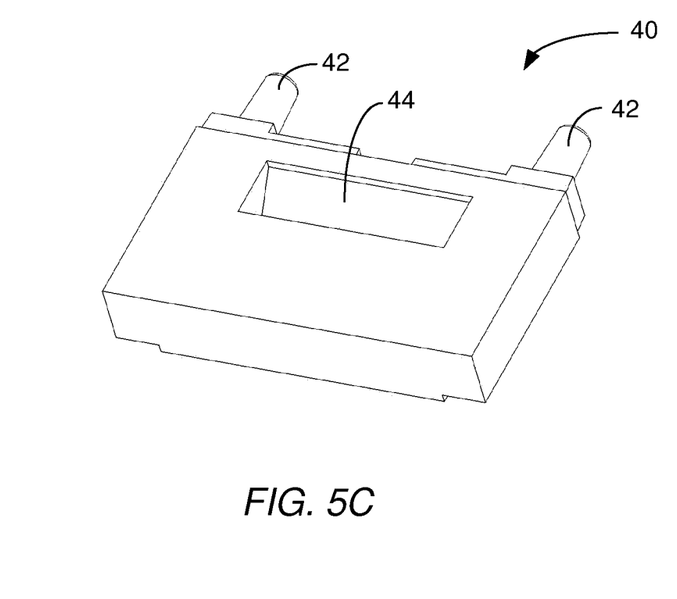
FIGS. 5C and 5D illustrate top and bottom perspective views, respectively, of the optics system of the OE/EO conversion module shown in FIGS. 5A and 5B.
Figure 5D:
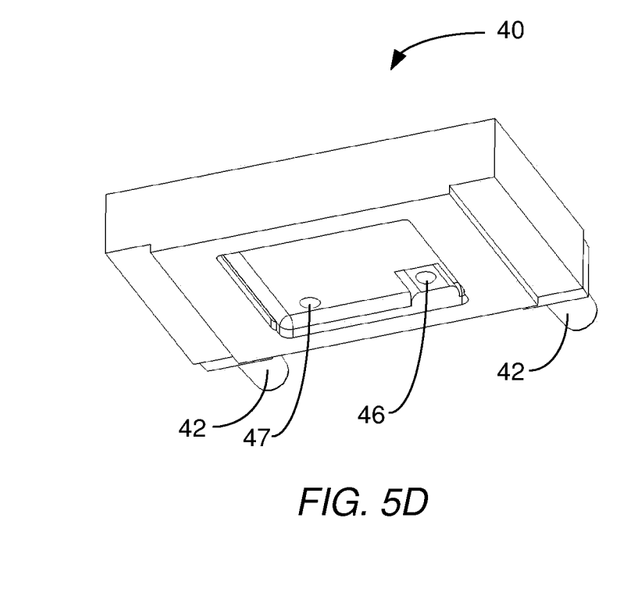

FIGS. 5A and 5B illustrate front and back perspective views of the OE/EO conversion module 20 shown in FIGS. 3A and 3B with the cover 21 of the OE/EO conversion module 20 removed. FIGS. 5C and 5D illustrate top and bottom perspective views, respectively, of the optics system 40 of the OE/EO conversion module 20 shown in FIGS. 5A and 5B. For illustrative purposes, the OE/EO conversion module 20 is shown in FIGS. 5A and 5B with the optics system 40 detached from the PCB 30 to allow other components of the module 20 to be seen. In particular, these other components of the module 20 include a controller IC 50, a photodiode 60, and a laser diode 70, which are mounted on the upper surface 30a of the PCB 30. Electrical power may be supplied to the OE/EO conversion module 20 via the USB electrical connections. A reflective surface 44 of the optics system 40 couples light between the laser diode 70 and a first lens 46 (FIG. 5D) of the optics system 40 and between the photodiode 60 and a second lens 47 (FIG. 5D) of the optics system 40. The reflective surface 44 (FIG. 5C) is typically a 45° total internal reflection (TIR) mirror.

The manner in which the OE/EO conversion module 20 operates will now be described with reference to FIGS. 5A-5D. In accordance with the illustrative embodiment, the laser diode 70 is a vertical cavity surface emitting laser diode (VCSEL) that emits light in a direction that is normal to the upper surface 30a of the PCB 30. The light emitted by the laser diode 70 is received by the first lens 46, which collimates the laser light and directs the collimated light onto the 45° minor 44. The 45° mirror 44 then reflects the light at a 90° angle to the beam of incidence toward the optical port 43a formed in the optics system 40. The collimated light passing out of the optical port 43a is focused by an external focusing lens (not shown) onto the end of a transmit optical fiber (not shown). Light passing out of the end of a receive optical fiber (not shown) is coupled by an external lens (not shown) onto the optical port 43b. The received light is then incident on the mirror 44 at an angle that is generally 0° (i.e., parallel) to the upper surface 30a of the PCB 30. The mirror 44 directs the light at a 90° angle to the beam of incidence toward the second lens 47. The second lens 47 focuses the light onto the photodiode 60.

It should be noted that although the optics system 40 turns the received light and the light to be transmitted by 90°, the turn could instead be accomplished electrically, in which case the OE and EO conversions are performed along the axes of the optical ports 43a and 43b and the corresponding electrical signals are communicated between the PCB 30 and corresponding OE and EO conversion elements along electrical conductors (not shown) that extend in directions that are generally normal to the upper surface 30a of the PCB 30. It should also be noted that while the optical system 40 turns the light at 90° angles, other optical configurations may be chosen that turn the light at angles other than 90°.

Figure 6A:
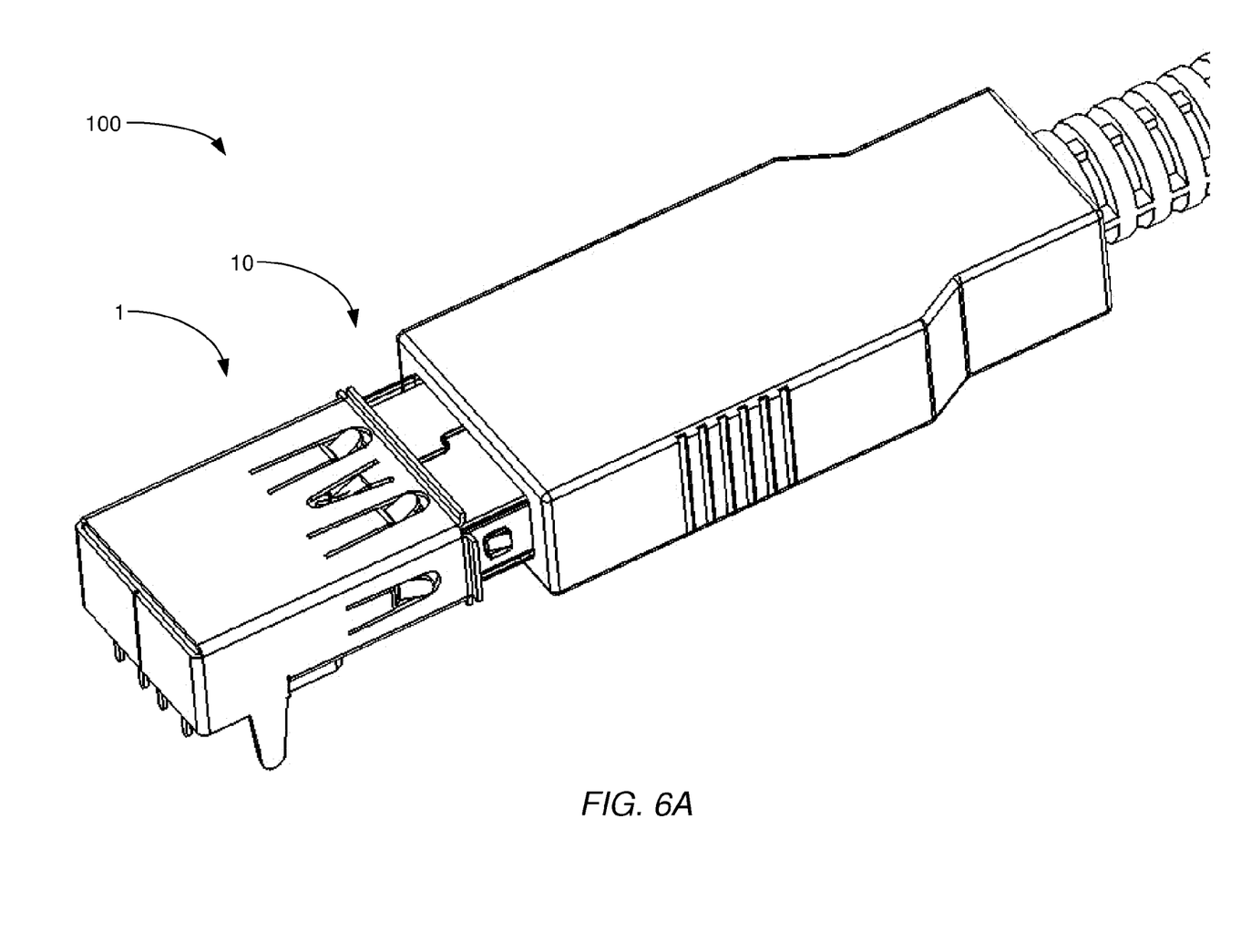
FIGS. 6A and 6B illustrate top and bottom perspective views, respectively, of a connector assembly comprising the socket shown in FIGS. 1A and 1B mated with the plug shown in FIG. 2.
Figure 6B:
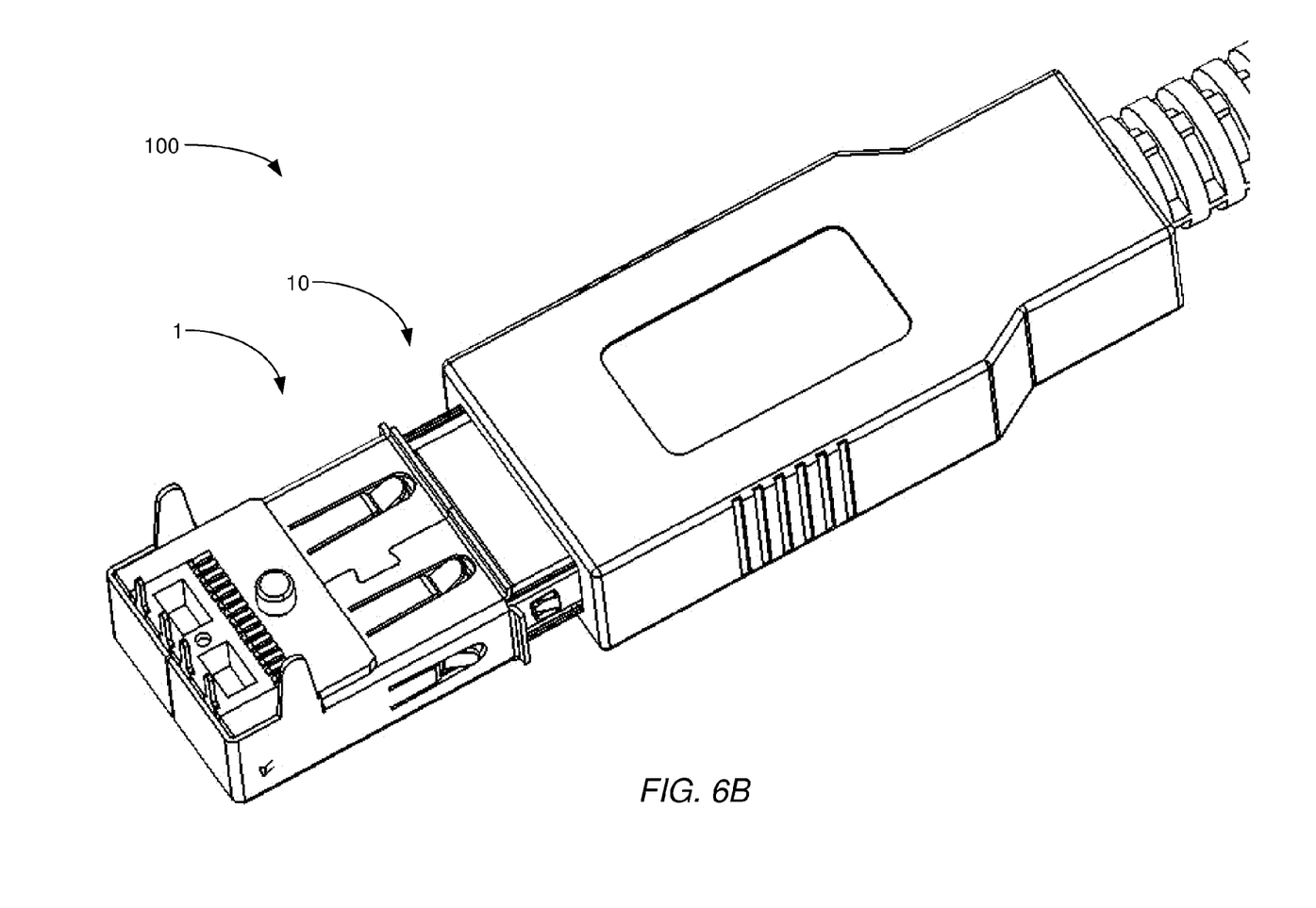

FIGS. 6A and 6B illustrate top and bottom perspective views, respectively, of the connector assembly 100 comprising the socket 1 shown in FIGS. 1A and 1B mated with the plug 10 shown in FIG. 2. As indicated above, the socket 1 may be mated with plugs other than the plug 10, such as USB2 and USB3 plugs. For illustrative purposes, the socket 1 is shown in FIGS. 6A and 6B mated with the plug 10. Depending on the type of cable that is terminated by the plug 10, the connector assembly 100 will operate as either a USB2 connector assembly or as a high data rate connector assembly. Specifically, if the cable has a USB2 wiring configuration, the connector assembly 100 will operate as a USB2 connector assembly; whereas if the cable is either an optical cable or a hybrid cable, then the connector assembly 100 will operate as a high data rate connector assembly. In the latter case, optical signals received over the receive optical fiber are converted by the OE/EO conversion module 20 of the plug 10 into high data rate electrical signals and high data rate electrical signals received in the plug 10 from the socket 1 are converted by the OE/EO conversion module 20 of the plug 10 into optical signals that are transmitted over the transmit optical fiber.

It should be noted that the connector assembly has been described with reference to a few illustrative embodiments in order to demonstrate the principles and concepts of the invention. It will be understood by persons of ordinary skill in the art, however, that the invention is not limited to these embodiments and that many modifications may be made to these embodiments without departing from the scope of the invention. For example, while the OE/EO conversion module 20 has been described with respect to a particular physical configuration, the OE/EO conversion module may have a variety of different physical configurations (e.g., multiple laser diodes and multiple photodiodes, various refractive, diffractive and/or reflective elements). Likewise, the socket housing 2 and the plug housing 11 may have a variety of different physical configurations.

What is claimed is:

1. A socket comprising:
   a socket housing having a plug opening therein for receiving a plug; and
   an electrical support structure secured to the socket housing, the electrical support structure having high data rate electrical connections disposed thereon for communicating high data rate signals and USB electrical connections disposed thereon for communicating USB signals.

2. The socket of claim 1, wherein the USB electrical connections are configured in accordance with a USB2 standard.

3. The socket of claim 2, wherein the plug opening is configured to receive either a USB2 plug or a USB3 plug.

4. The socket of claim 3, wherein the high data rate electrical connections are high-resolution display device connections, and wherein high data rate signals are high-resolution display signals.

5. A connector assembly comprising:
   a socket comprising:
      a socket housing having a plug opening therein for receiving a plug; and
      an electrical support structure secured to the socket housing, the electrical support structure having high data rate electrical connections disposed thereon for communicating high data rate signals and USB electrical connections disposed thereon for communicating USB signals;
   and
   a plug comprising:
      a plug housing that is mated with the plug opening of the socket, the plug housing including at least one of USB electrical connections and high data rate electrical connections, wherein if the plug housing has USB electrical connections, the USB electrical connections of the plug housing are interfaced with the USB electrical connections of the socket housing, and wherein if the plug housing has high data rate electrical connections, the high data rate electrical connections of the plug housing are interfaced with the high data rate electrical connections of the socket housing.

6. The connector assembly of claim 5, wherein the plug housing has USB electrical connections and high-speed electrical connections, the plug further comprising:
   an optics system disposed within the plug housing; and
   an optical-to-electrical/electrical-to-optical (OE/EO) conversion module disposed within the plug housing, the OE/EO conversion module converting high data rate signals communicated from the socket housing to the plug housing into first optical signals that are coupled by the optics system into an end of a first optical fiber, the OE/EO conversion module converting optical signals coupled onto the OE/EO conversion module by the optics system into high data rate display signals.

7. The connector assembly of claim 6, wherein the USB electrical connections are USB2 electrical connections configured in accordance with a USB2 standard.

8. The connector assembly of claim 6, wherein electrical power is supplied to the OE/EO conversion module via the USB electrical connections.

9. The connector assembly of claim 5, wherein the plug is a USB2 plug having USB electrical connections that are configured in accordance with a USB2 standard.

10. The connector assembly of claim 5, wherein the plug is a USB3 plug having USB electrical connections that are configured in accordance with a USB3 standard, and wherein the USB electrical connections of the socket are configured in accordance with a USB2 standard, and wherein the plug and the socket operate in accordance with the USB2 standard.

11. A connector assembly comprising:
    a socket comprising:
       a socket housing having a plug opening therein for receiving a plug; and
       an electrical support structure secured to the socket housing, the electrical support structure having high data rate electrical connections disposed thereon for communicating high data rate signals and USB electrical connections disposed thereon for communicating USB signals;
    and
    a plug comprising:
       a plug housing that is mated with the plug opening of the socket, the plug housing including USB electrical connections and high data rate electrical connections, the USB electrical connections of the plug housing being interfaced with the USB electrical connections of the socket housing, the high data rate electrical connections of the plug housing being interfaced with the high data rate electrical connections of the socket housing;
       an optics system disposed within the plug housing; and
       an optical-to-electrical/electrical-to-optical (OE/EO) conversion module disposed within the plug housing, the OE/EO conversion module converting high data rate signals communicated from the socket housing to the plug housing into first optical signals that are coupled by the optics system into an end of a first optical fiber, the OE/EO conversion module converting optical signals coupled onto the OE/EO conversion module by the optics system into high data rate signals.

12. The connector assembly of claim 11, wherein electrical power is supplied to the OE/EO conversion module via the USB electrical connections.

13. A method for communicating signals in a connector assembly comprising:
  mating a plug of the connector assembly with a socket of the connector assembly, the plug and the socket each having high data rate electrical connections for communicating high data rate signals and Universal Serial Bus (USB) electrical connections for communicating USB signals, the high data rate electrical connections of the plug being electrically coupled to the high data rate electrical connections of the socket, the USB electrical connections of the plug being electrically coupled to the USB electrical connections of the socket, the plug including an optics system and an optical-to-electrical/electrical-to-optical (OE/EO) conversion module disposed within a plug housing of the plug;
  in the OE/EO conversion module of the plug, converting high data rate signals communicated from the socket housing to the plug housing into first optical signals;
  with the optics system, coupling the first optical signals into an end of a first optical fiber;
  with the optics system, coupling second optical signals passing out of an end of a second optical fiber onto the OE/EO conversion module; and
  in the OE/EO conversion module, converting the second optical signals into high data rate signals and communicating the high data rate signals from the plug to the socket via the electrically coupled high data rate electrical connections of the plug and socket.

14. The method of claim 13, wherein the USB electrical connections of the plug and socket are USB2 electrical connections configured in accordance with a USB2 standard.

15. The method of claim 13, further comprising:
  supplying electrical power to the OE/EO conversion module via the USB electrical connections.

16. A method for communicating signals in a connector assembly comprising:
  mating a plug of the connector assembly with a socket of the connector assembly, the socket having high data rate electrical connections for communicating high data rate signals and Universal Serial Bus (USB) electrical connections for communicating USB signals, the socket having at least one of high data rate electrical connections for communicating high data rate signals and USB electrical connections for communicating USB signals, wherein if the plug has USB electrical connections, the USB electrical connections of the plug are electrically coupled to the USB electrical connections of the socket, and wherein if the plug has high data rate electrical connections, the high data rate electrical connections of the plug are electrically coupled to the high data rate electrical connections of the socket.

17. The method of claim 16, wherein the plug has at least USB electrical connections, and wherein the USB electrical connections of the plug and of the housing are configured in accordance with a USB2 standard.

18. The method of claim 16, wherein the plug has at least the USB electrical connections, and wherein the USB electrical connections of the plug are configured in accordance with a USB3 standard, and wherein the USB electrical connections of the socket are configured in accordance with a USB2 standard, and wherein the connector assembly operates in accordance with the USB2 standard.

19. The method of claim 16, wherein the plug has the USB electrical connections and the high data rate electrical connections, and wherein the USB electrical connections of the plug and of the socket are configured in accordance with a USB2 standard.

20. The method of claim 19, wherein the plug further includes an optics system and an optical-to-electrical/electrical-to-optical (OE/EO) conversion module, the method further comprising:
  in the OE/EO conversion module of the plug, converting high data rate signals communicated from the socket to the plug into first optical signals;
  with the optics system, coupling the first optical signals into an end of a first optical fiber;
  with the optics system, coupling second optical signals passing out of an end of a second optical fiber onto the OE/EO conversion module; and
  in the OE/EO conversion module, converting the second optical signals into high data rate signals and communicating the high data rate signals from the plug to the socket via the electrically coupled high data rate electrical connections of the plug and socket.

21. The method of claim 20, further comprising:
supplying electrical power to the OE/EO conversion module via the USB electrical connections.

* * * * *